US 11,378,031 B2

(12) United States Patent
Kitahata et al.

(10) Patent No.: US 11,378,031 B2
(45) Date of Patent: Jul. 5, 2022

(54) CONTROL APPARATUS FOR VEHICLE

(71) Applicant: TOYOTA JIDOSHA KABUSHIKI KAISHA, Toyota (JP)

(72) Inventors: Takeshi Kitahata, Toyota (JP); Atsushi Tabata, Okazaki (JP); Kenji Miyasaka, Toyota (JP); Kodo Nakawatari, Nagakute (JP); Koichi Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 103 days.

(21) Appl. No.: 17/071,023

(22) Filed: Oct. 15, 2020

(65) Prior Publication Data
US 2021/0131370 A1   May 6, 2021

(30) Foreign Application Priority Data

Nov. 6, 2019  (JP) .............................. JP2019-201837

(51) Int. Cl.
 *F02D 41/06*  (2006.01)
 *B60K 35/00*  (2006.01)
 *B60W 50/14*  (2020.01)

(52) U.S. Cl.
CPC ............ *F02D 41/062* (2013.01); *B60K 35/00* (2013.01); *B60W 50/14* (2013.01);
(Continued)

(58) Field of Classification Search
CPC ........... F02D 41/062; F02D 2200/0611; F02D 2041/228; F02D 2041/286;
(Continued)

(56) References Cited

U.S. PATENT DOCUMENTS

2008/0234103 A1* 9/2008 Jess ......................... F16H 59/34
477/121
2009/0030588 A1* 1/2009 Yamashita .......... F02D 19/0623
701/103
(Continued)

FOREIGN PATENT DOCUMENTS

JP        2009-196449 A    9/2009

*Primary Examiner* — Sizo B Vilakazi
(74) *Attorney, Agent, or Firm* — Oliff PLC

(57) ABSTRACT

A control apparatus for a vehicle includes: a characteristic storage portion configured to store therein torque-characteristic information representing an output torque characteristic as a characteristic of an output torque of an engine of the vehicle, which has appeared in a certain control operation, such that the stored torque-characteristic information is divided into a plurality of groups corresponding to respective refueling points that provide the fuel; and a factor determination portion configured, when the output torque characteristic represented by the torque-characteristic information belonging to one of the plurality of groups and the output torque characteristic represented by the torque-characteristic information belonging to another one of the plurality of groups are different from each other and a characteristic difference therebetween is not smaller than a threshold value, to determine that the characteristic difference is caused by a difference in a property of the fuel.

7 Claims, 8 Drawing Sheets

(52) U.S. Cl.
CPC .. *B60K 2370/166* (2019.05); *B60K 2370/174* (2019.05); *B60K 2370/178* (2019.05); *F02D 2200/0611* (2013.01)

(58) Field of Classification Search
CPC ....... F02D 2200/0612; F02D 2200/701; B60K 35/00; B60K 2370/166; B60K 2370/174; B60K 2370/178; B60K 6/365; B60K 6/445; B60K 2370/169; B60W 50/14; B60W 30/1882; B60W 2050/0088; B60W 2530/209; B60W 2530/211; B60W 10/06; B60W 10/08; B60W 20/00; B60W 20/18; B60W 2510/244; B60W 2556/45; B60W 2556/50; B60W 2556/60; B60W 50/0205; F02N 11/00; F02N 11/0818; F02N 11/0848; F02N 2200/042; Y02T 10/62; Y02T 10/84; B67D 7/32
See application file for complete search history.

(56) References Cited

U.S. PATENT DOCUMENTS

| | | | | |
|---|---|---|---|---|
| 2010/0088008 A1* | 4/2010 | Tanaka | ................ | F02D 41/1497 |
| | | | | 701/104 |
| 2013/0311063 A1* | 11/2013 | Ito | ........................... | F02D 41/04 |
| | | | | 701/103 |
| 2014/0156173 A1* | 6/2014 | Hoda | ................... | F02D 41/345 |
| | | | | 701/104 |
| 2015/0239454 A1* | 8/2015 | Sujan | ..................... | F02D 29/02 |
| | | | | 701/54 |

* cited by examiner

CONTROL APPARATUS FOR VEHICLE

This application claims priority from Japanese Patent Application No. 2019-201837 filed on Nov. 6, 2019, the disclosure of which is herein incorporated by reference in its entirety.

FIELD OF THE INVENTION

The present invention relates to a control apparatus for a vehicle, wherein the control apparatus is provided to determine a factor causing change of an engine torque characteristic of the vehicle.

BACKGROUND OF THE INVENTION

There is well-known a control apparatus for a vehicle that includes an engine configured to generate a drive force by combustion of a fuel. A running control apparatus for a hybrid vehicle, which is disclosed in JP2009-196449A, is an example of such a control apparatus. This Japanese Patent Application Publication discloses searching a refueling station in which a cold-weather fuel is available when a destination of the vehicle is a cold weather area.

SUMMARY OF THE INVENTION

By the way, there could be a refueling point providing a fuel having a different property due to, for example, a damaged equipment in the refueling point. The different property of the fuel could change a characteristic of an output torque of the engine, thereby causing a risk of reduction of drivability when a certain control operation is executed. However, the characteristic of the output torque of the engine could be changed also by other factors such as an outside temperature or other environments. It is therefore difficult to quickly determine that the change of the output torque characteristic of the engine, i.e., the reduction of the drivability is caused by the different property of the fuel.

The present invention was made in view of the background art described above. It is therefore an object of the present invention to provide a control apparatus for a vehicle, wherein the control apparatus is capable of quickly detecting reduction of a drivability due to a difference in a fuel property.

The object indicated above is achieved according to the following aspects of the present invention.

According to a first aspect of the invention, there is provided a control apparatus for a vehicle that includes an engine configured to generate a drive force by combustion of a fuel, the control apparatus comprising: (a) a characteristic storage portion configured to store therein torque-characteristic information representing an output torque characteristic as a characteristic of an output torque of the engine, which has appeared in execution of a certain control operation in the vehicle, such that the stored torque-characteristic information is divided into a plurality of groups corresponding to respective refueling points that provide the fuel; and (b) a factor determination portion configured, when the output torque characteristic represented by the torque-characteristic information belonging to one of the plurality of groups and the output torque characteristic represented by the torque-characteristic information belonging to another one of the plurality of groups are different from each other and a characteristic difference (characteristic variation) therebetween is not smaller than a threshold value, to determine that the characteristic difference is caused by a difference (variation) in a property of the fuel.

According to a second aspect of the invention, in the control apparatus according to the first aspect of the invention, there is further provided an engine control portion configured to execute an engine-start control operation for starting the engine, wherein the certain control operation is the engine control portion, and wherein the output torque characteristic is a length of time from a point of time at which execution of the engine-start control operation has been started, to a point of time at which the output torque of the engine has started to be generated.

According to a third aspect of the invention, in the control apparatus according to the second aspect of the invention, when it is determined by the factor determination portion that the characteristic difference is caused by the difference in the property of the fuel, the engine control portion is configured to restrict an intermittent operation of the engine.

According to a fourth aspect of the invention, in the control apparatus according to any one of the first through third aspects of the invention, the characteristic storage portion is configured, when the certain control operation has been executed, with a fuel tank of the vehicle storing therein (i) a remaining fuel as the fuel that had remained in the fuel tank before the vehicle has been refueled at one of the refueling points and (ii) a newly introduced fuel as the fuel that has been newly introduced into the fuel tank when the vehicle has been refueled at the one of the refueling points, to store therein the torque-characteristic information representing the output torque characteristic, such that the stored torque-characteristic information is divided into two groups as the plurality of groups, based on a ratio between an amount of the remaining fuel and an amount of the newly introduced fuel.

According to a fifth aspect of the invention, in the control apparatus according to any one of the first through fourth aspects of the invention, the refueling points are respective storage tanks each provided in a refueling station, so that the stored torque-characteristic information is divided into the plurality of groups corresponding to the respective storage tanks.

According to a sixth aspect of the invention, in the control apparatus according to any one of the first through fifth aspects of the invention, the factor determining portion is configured to determine whether the characteristic difference is smaller than the threshold value or not, by using not only the torque-characteristic information of the vehicle but also other-vehicle-torque-characteristic information of at least one other vehicle other than the vehicle, the other-vehicle-torque-characteristic information representing the output torque characteristic that has appeared in execution of the certain control operation in the at least one other vehicle, such that the other-vehicle-torque-characteristic information is stored and is divided into a plurality of groups corresponding to the respective refueling points.

According to a seventh aspect of the invention, in the control apparatus according to any one of the first through sixth aspects of the invention, there is further provided a notification portion configured, when it is determined by the factor determination portion that the characteristic difference is caused by the difference in the property of the fuel, to notify a driver of the vehicle of information related to the refueling points.

In the control apparatus according to the first aspect of the invention, when the output torque characteristic represented by the torque-characteristic information belonging to one of the plurality of groups and the output torque characteristic represented by the torque-characteristic information belonging to another one of the plurality of groups are different from each other and the characteristic difference therebetween is not smaller than the threshold value, it is determined that the characteristic difference is caused by a difference in the property of the fuel. It is therefore possible to quickly detect reduction of a drivability due to the difference in the property of the fuel.

In the control apparatus according to the second aspect of the invention, the certain control operation is the engine control portion, and the output torque characteristic is the length of time from the point of time at which execution of the engine-start control operation has been started, to the point of time at which the output torque of the engine has started to be generated. It is therefore possible to quickly detect reduction of a drivability in the engine-start control operation, due to the difference in the property of the fuel.

In the control apparatus according to the third aspect of the invention, when it is determined by the factor determination portion that the characteristic difference is caused by the difference in the property of the fuel, the intermittent operation of the engine is restricted so that it is possible to reduce a frequency of reduction of controllability in execution of the engine-start control operation.

In the control apparatus according to the fourth aspect of the invention, the torque-characteristic information is stored such that the stored torque-characteristic information is divided into the plurality of groups corresponding to the respective refueling points, namely, divided into a group corresponding to the refueling point of the remaining fuel and a group corresponding to the refueling point of the newly introduced fuel, based on a ratio between an amount of the remaining fuel and an amount of the newly introduced fuel. It is therefore possible to improve an accuracy of the determination that the characteristic difference is caused by the difference in the property of the fuel.

In the control apparatus according to the fifth aspect of the invention, the refueling points are storage tanks each provided in a refueling station, so that the stored torque-characteristic information is divided into the plurality of groups corresponding to the respective storage tanks, whereby the characteristic of the output torque of the engine in case of each one of the storage tanks can be obtained. This arrangement makes it possible to detect a failure of each one of the storage tank in the refueling station and obtain the characteristic of the output torque of the engine in case of each one of the oil suppliers.

In the control apparatus according to the sixth aspect of the invention, it is determined whether the characteristic difference is at least the threshold value or not, by using not only the torque-characteristic information of the vehicle but also the other-vehicle-torque-characteristic information of the at least one other vehicle, wherein the other-vehicle-torque-characteristic information representing the output torque characteristic that has appeared in execution of the certain control operation in the at least one other vehicle, such that the other-vehicle-torque-characteristic information is divided into the plurality of groups corresponding to the respective refueling points. It is therefore possible to improve the accuracy of the determination that the characteristic difference is caused by the difference in the property of the fuel, and to further quickly detect the reduction of the drivability due to the difference in the property of the fuel.

In the control apparatus according to the seventh aspect of the invention, when it is determined by the factor determination portion that the characteristic difference is caused by the difference in the property of the fuel, the information related to the refueling points is notified to the vehicle driver. It is therefore possible to try to improve the drivability earlier than an opportunity in which a factor causing reduction of the drivability is investigated and a countermeasure is taken to resolve the reduction of the drivability, for example, in a maintenance shop of a vehicle dealer.

DETAILED DESCRIPTION OF PREFERRED EMBODIMENT

In the embodiment of the present invention, the vehicle includes a transmission. A gear ratio in the transmission is defined as "rotational speed of input-side rotary member/ rotational speed of output-side rotary member". A running speed of the vehicle could be lower as the gear ratio is higher, and could be higher as the gear ratio is lower. The highest gear ratio can be expressed also as a lowest-speed gear ratio, while the lowest gear ratio can be expressed also as a highest-speed gear ratio.

The above-described engine is a drive force source, and is, for example, an internal combustion engine such as gasoline engine and diesel engine. Further, the vehicle may include, for example, an electric motor as another drive force source in addition to or in place of the internal combustion engine. The electric motor is broadly interpreted as a kind of an engine.

Hereinafter, preferred embodiment of the invention will be described in detail with reference to the accompanying drawings.

Embodiment

Figure 1:
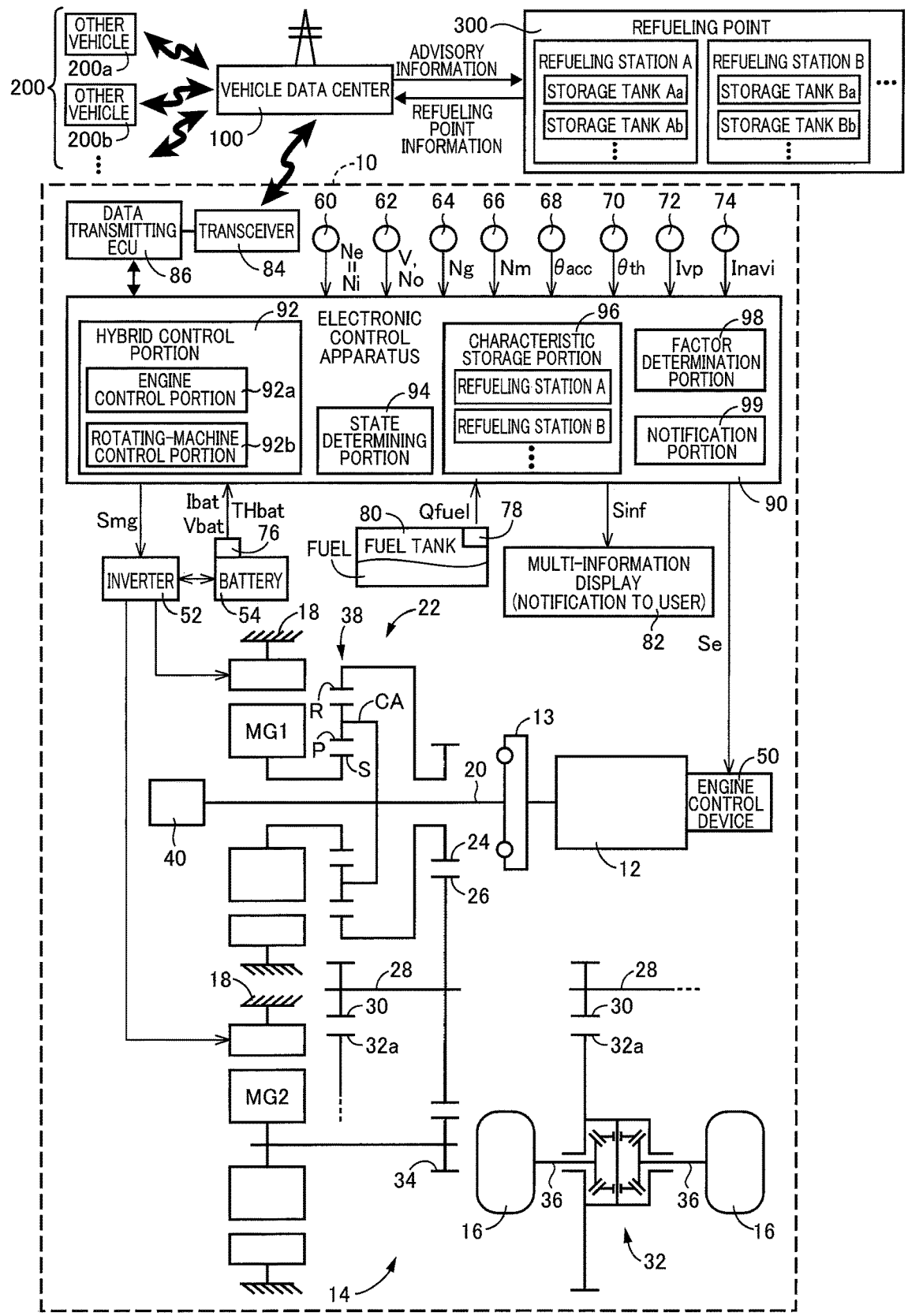
FIG. 1 is a view schematically showing a construction of a vehicle to which the present invention is applied, for explaining major portions of control functions and control systems that are provided to perform various control operations in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 includes an engine 12, first and second rotating machines MG1, MG2, a drive-force transmitting device 14 and drive wheels 16.

The engine 12 is a known internal combustion engine such as gasoline engine and diesel engine, which serves as a drive force source capable of generating a drive torque. That is, the engine 12 is a vehicle engine configured to generate a drive force by combustion of a fuel FUEL. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 12, is controlled.

Each of the first and second rotating machines MG1, MG2 is a rotating electric machine having a function serving as an electric motor and a function serving as an electric generator. That is, each of the first and second rotating machines MG1, MG2 is a so-called "motor generator". The first and second rotating machines MG1, MG2 are connected to a battery 54 provided in the vehicle 10, through an inverter 52 provided in the vehicle 10. The inverter 52 is controlled by the electronic control apparatus 90 whereby an MG1 torque Tg and an MG2 torque Tm as output torques of the respective first and second rotating machines MG1, MG2 are controlled. The output torque of each of the first and second rotating machines MG1, MG2 serves as a power running torque when acting as a positive torque for acceleration, with the each of the first and second rotating machines MG1, MG2 being rotated in a forward direction. The output torque of each of the first and second rotating machines MG1, MG2 serves as a regenerative torque when acting as a negative torque for deceleration, with the each of the first and second rotating machines MG1, MG2 being rotated in the forward direction. The battery 54 is an electric storage device to and from which an electric power is supplied from and to the first rotating machine MG1 and the second rotating machine MG2. The first and second rotating machines MG1, MG2 are disposed inside a non-rotary member in the form of a casing 18 that is attached to a body of the vehicle 10.

The drive-force transmitting device 14 includes an input shaft 20, a transmission portion 22, a drive gear 24, a driven gear 26, a driven shaft 28, a final gear 30, a differential gear 32 and a reduction gear 34 that are disposed inside the casing 18. The input shaft 20 is an input rotary member of the transmission portion 22, and is connected to the engine 12 through, for example, a damper 13 that is provided in the vehicle 10. The transmission portion 22 is connected to the input shaft 20. The drive gear 24 is an output rotary member of the transmission portion 22, and meshes with the driven gear 26. The driven gear 26 and the final gear 30 are fixedly mounted on the driven shaft 28, so as to be unrotatable relative to each other. The final gear 30 has a diameter smaller than a diameter of the driven gear 26. The differential gear 32 meshes with the final gear 30 through a differential ring gear 32a. The reduction gear 34 has a diameter smaller than a diameter of the driven gear 26, and meshes with the driven gear 26. The reduction gear 34 is fixedly mounted on a rotor shaft of the second rotating machine MG2, whereby the second rotating machine MG2 is connected to the reduction gear 34 in a drive-force transmittable manner. The drive-force transmitting device 14 further includes axles 36 that are connected to the differential gear 32.

The drive-force transmitting device 14 constructed as described above is advantageously used in a vehicle of FF (front engine/front drive) system or RR (rear engine/rear drive) system. The drive-force transmitting device 14 transmits a drive force outputted from the engine 12 and a drive force outputted from the second rotating machine MG2 to the driven gear 26, and then transmits, from the driven gear 26, to the drive wheels 15, through sequentially the final gear 30, the differential gear 32, and the axles 36, for example. Thus, the second rotating machine MG2 is connected to the drive wheels 16 in a drive-force transmittable manner. The vehicle 10 is a hybrid vehicle having drive force sources in the form of the engine 12 and the second rotating machine MG2. The drive force is synonymous with a drive torque or a drive power unless otherwise distinguished from them.

The transmission portion 22 constitutes a part of the drive-force transmitting device 14, and transmits the drive force of the engine 12 to the driven gear 26. The transmission portion 22 includes a differential mechanism 38 to which the engine 12 is connected in a drive-force transmittable manner. The differential mechanism 38 is a planetary gear device of a single-pinion type including a sun gear S, pinions P, a carrier CA and a ring gear P that meshes with the sun gear S through the pinions P each of which is held by the carrier CA so as to be rotatable about its axis and about an axis of the input shaft 20. The carrier CA is connected to the engine 12 through the input shaft 20, so as to constitute a rotary element to which the engine 12 is connected in a drive-force transmittable manner. The sun gear S is connected integrally to a rotor shaft of the first rotating machine MG1, so as to constitute a rotary element to which the first rotating machine MG1 is connected in a drive-force transmittable manner. The ring gear R is connected integrally to the drive gear 24, so as to constitute a rotary element which is connected to the drive wheels 16 in a drive-force transmittable manner. The differential mechanism 38 serves as a drive-force distributing device to mechanically distribute the drive force of the engine 12 inputted to the carrier CA, to the first rotating machine MG1 and to the drive gear 24. In the differential mechanism 38, the carrier CA serves as an input rotary element, the sun gear S serves as a reaction rotary element and the ring gear R serves as an output rotary element. The transmission portion 22 cooperates with the first rotating machine MG1 that is connected to the differential mechanism 38 in a drive-force transmittable manner, to constitute an electrically-controlled transmission mechanism in the form of an electrically-controlled continuously-variable transmission in which a differential state of the differential mechanism 38 is to be controlled by controlling an operation state of the first rotating machine MG1, namely, by controlling an operation of the first rotating machine MG1.

The vehicle 10 further includes a mechanical oil pump 40. The oil pump 40 is connected to the input shaft 20, and is to be driven or operated by the engine 12 so as to supply an oil that is to be used to lubricate and cool various parts of the drive-force transmitting device 14.

Figure 2:
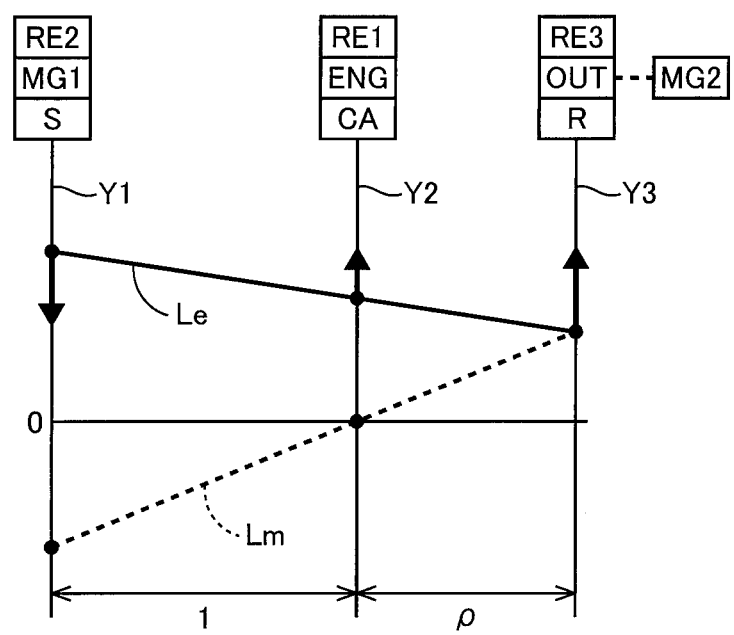
FIG. 2 is a collinear chart indicating a relationship among rotational speeds of rotary elements of a transmission portion.

FIG. 2 is a collinear chart indicating a relationship among rotational speeds of rotary elements of the transmission portion 22. In FIG. 2, three vertical lines Y1, Y2, Y3 correspond to the respective three rotary elements of the differential mechanism 38 constituting the transmission portion 22. The vertical line Y1 represents a rotational speed of a second rotary element RE2 in the form of the sun gear S to which the first rotating machine MG1 (see "MG1" in FIG. 2) is connected. The vertical line Y2 represents a rotational speed of a first rotary element RE1 in the form of the carrier CA to which the engine 12 (see "ENG" in FIG. 2) is connected. The vertical line Y3 represents a rotational speed of a third rotary element RE3 in the form of the ring gear R which is connected integrally to the drive gear 24 (see "OUT" in FIG. 2) is connected. To the driven gear 26 meshing with the drive gear 24, the second rotating machine MG2 (see "MG2" in FIG. 2) is connected through, for example, the reduction gear 34. An interval between the vertical lines Y1, Y2, Y3 is determined in accordance with a gear ratio ρ (=number of teeth of the sun gear S/number of teeth of the ring gear R) of the differential mechanism 38. Where an interval between the sun gear S and the carrier CA is set to an interval corresponding to "1" in the relationship between the vertical axes of the collinear chart, an interval corresponding to the gear ratio ρ is set between the carrier CA and the ring gear R.

In FIG. 2, solid line Le indicates an example of the relationship among the relative rotational speeds of the respective rotary elements RE1, RE2, RE3 in a forward running of the vehicle 10 during an HV running mode that is a running mode enabling the vehicle 10 to perform a hybrid running with at least the engine 12 being operated as the drive force source. During the HV running mode, when a reaction torque, i.e., a negative torque from the first rotating machine MG1, is inputted to the sun gear S0 against the engine torque Te inputted to the carrier CA0 in the differential mechanism 32, an engine direct transmission torque Td [=Te/(1+ρ)=−(1/ρ)×Tg] appears in the ring gear R0 as a positive torque. Then, a combined torque of the engine direct transmission torque Td and the MG2 torque Tm, which are transmitted to the driven gear 26, can be transmitted as the drive torque of the vehicle 10 to the drive wheels 16, depending on a required drive force. The first rotating machine MG1 serves as the electric generator when generating the negative torque while being rotated in negative direction. A generated electric power Wg of the first rotating machine MG1 is used to charge the battery 54, and is consumed by the second rotating machine MG2. The second rotating machine MG2 outputs the MG2 torque Tm, by using all or a part of the generated electric power Wg of the first rotating machine MG1, or by using an electric power of the battery 54 in addition to the generated electric power Wg. During a forward running of the vehicle 10, the MG2 torque Tm is a power running torque that is a positive torque generated by the second rotating machine MG2 rotated in positive direction. During a reverse running of the vehicle 10, the MG2 torque Tm is a power running torque that is a negative torque generated by the second rotating machine MG2 rotated in negative direction.

The transmission portion 22 is operated as the electrically-controlled continuously-variable transmission having a changeable gear ratio γ (=input rotational speed Ni/output rotational speed No). For example, during the HV running mode during which the output rotational speed No as the rotational speed of the drive gear 24 is constrained by rotation of the drive wheels 16, when the rotational speed of the sun gear S, i.e., the rotational speed of the first rotating machine MG1 is increased or reduced by control of the operation state of the first rotating machine MG1, the rotational speed of the carrier CA is increased or reduced. With the rotational speed of the carrier CA being increased or reduced, the engine rotational speed Ne as the rotational speed of the engine 12 is increased or reduced. Therefore, in the HV running, an engine operation point can be controlled to an efficient operation point. This kind of hybrid type is called a mechanical split type or simply a split type. The first rotating machine MG1 is a rotating machine capable of controlling the engine rotational speed Ne. The operation point is defined by a rotational speed and a torque. The engine operation point is the operation point of the engine 12, which is defined by the engine rotational speed Ne and the engine torque Te. The input rotational speed Ni is a rotational speed of the input shaft 20, and is equal to the engine rotational speed Ne.

In FIG. 2, broken line Lm indicates an example of the relationship among the relative rotational speeds of the respective rotary elements RE1, RE2, RE3 in a forward running of the vehicle 10 during an EV running mode that is a running mode enabling the vehicle 10 to perform a motor running with the second rotating machine MG2 being operated as the drive force source and with the engine 12 being stopped. During the EV running mode, the first rotating machine MG1 is placed in a load-free state so as to be freely rotated in negative direction, and rotation of the carrier CA is stopped whereby the engine rotational speed Ne is made zero. In this state with only the second rotating machine MG2 being operated as the drive force source, the MG2 torque Tm, which is the positive torque generated by the second rotating machine MG2 rotated in positive direction, is transmitted as the drive torque causing the vehicle 10 to run in forward direction, to the drive wheels 16 through, for example, the driven gear 26, final gear 30 and differential gear 32.

Referring back to FIG. 1, the vehicle 10 is provided with the electronic control apparatus 90 as a controller including the control apparatus which is constructed according to present invention and which is configured to control, for example, the engine 12, first rotating machine MG1 and second rotating machine MG2. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 may be constituted by two or more control units exclusively assigned to perform different control operations such as an engine control operation and a rotating-machine control operation, as needed. The electronic control apparatus 90 serves as "control apparatus" recited in the appended claims, namely, the control apparatus that is to be used for the vehicle 10.

The electronic control apparatus 90 receives various input signals based on values detected by respective sensors provided in the vehicle 10. Specifically, the electronic control apparatus 90 receives: an output signal of an engine speed sensor 60 indicative of an engine rotational speed Ne as a rotational speed of the engine 12 which is equal to the above-described input rotational speed Ni; an output signal of an output speed sensor 62 indicative of an output-shaft rotational speed No which corresponds to the running speed V of the vehicle 10; an output signal of a MG1 speed sensor 64 indicative of an MG1 rotational speed Ng which is a rotational speed of the first rotating machine MG1; an output signal of a MG2 speed sensor 66 indicative of an MG2 rotational speed Nm which is a rotational speed of the second rotating machine MG2; an output signal of an accelerator-opening degree sensor 68 indicative of an accelerator opening degree (accelerator operation degree) θacc representing an amount of accelerating operation made by the vehicle driver; an output signal of a throttle-opening degree sensor 70 indicative of a throttle opening degree θth which is an opening degree of an electronic throttle valve operated by a throttle actuator; an output signal of a vehicle location sensor 72 indicative of location information Ivp; an output signal of a navigation system 74 indicative of navigation information Inavi; an output signal of a battery sensor 76 indicative of a battery temperature THbat, a battery charging/discharging electric current Ibat and a battery voltage Vbat of the battery 54; and an output signal of a remaining fuel sensor 78 indicative of a remaining fuel amount Qfuel that is an amount of the fuel FUEL of the engine 12 remaining in a fuel tank 80 which is provided in the vehicle 10 and which stores therein the fuel FUEL.

The vehicle location sensor 72 includes a GPS antenna. The location information Ivp outputted by the vehicle location sensor 72 includes own-vehicle location information representing a location of the vehicle 10 on the earth's surface or a map based on, for example, GPS signals (Orbit signals) transmitted by GPS (Global Positioning System) satellites.

The navigation system 74 is a known navigation system including a display and a speaker, and is configured to specify a location of the vehicle 10 on pre-stored map data, based on the location information Ivp, and to indicate the location of the vehicle 10 on the map displayed on the display. The navigation system 74 receives a destination point inputted thereto, calculates a running route from a departure point to the destination point, and informs, as instructions, the vehicle driver of the running route, for example, through the display and the speaker. The navigation information Inavi includes map information such as road information and facility information that are based on the map data pre-stored in the navigation system 74. The road information includes information related to types of roads (such as urban roads, suburban roads, mountain roads and highway load), branching and merging of roads, road gradients, and running speed limits. The facility information includes information of types, locations, names of sites such as supermarkets, restaurants, parking lots, parks, places for refueling the vehicle 10 with the fuel FUEL, places for repairing the vehicle 10, a home of vehicle's owner and service areas located on the highway load. The service areas are sites which are located on, for example, the highway load, and in which there are facilities for parking, eating, and refueling.

The electronic control apparatus 90 calculates a charged state value SOC [Vo] that is a value representing a state of charge of the battery 54, based on, for example, the battery charging/discharging electric current that and the battery voltage Vbat of the battery 54. The electronic control apparatus 90 further calculates, based on, for example, the battery temperature THbat and the charged state value SOC of the battery 54, a maximum charging amount Win and a maximum discharging amount Wout that define a range of a battery power Pbat as a power of the battery 54 that can be used. The maximum charging amount Win of the battery 54 is an inputtable electric power that defines a limit of an input electric power Wbin inputted to the battery 54. The maximum discharging amount Wout of the battery 54 is an outputtable electric power that defines a limit of an output electric power Wbout outputted from the battery 54. The calculated maximum charging and discharging amounts Win and Wout is reduced with reduction of the battery temperature Thbat, for example, when the battery temperature THbat is lower than a normal level, and is reduced with increase of the battery temperature Thbat, for example, when the battery temperature THbat is higher than the normal level. Further, the maximum charging amount Win is reduced with increase of the charged state value SOC, for example, when the charged state value SOC is relatively large. The maximum discharging amount Wout is reduced with reduction of the charged state value SOC, for example, when the charged state value SOC is relatively small.

The electronic control apparatus 90 generates various output signals to the various devices provided in the vehicle 10, such as: an engine control command signal Se that is to be supplied to the engine control device 50 for controlling the engine 12, rotating-machine control command signals Smg that are to be supplied to the inverter 52 for controlling the first and second rotating machines MG1, MG2; and an information-notification-control command signal Sinf that is to be supplied to a multi-information display 82, for warning and notifying the vehicle driver.

The multi-information display 82 is an information notification device for warning and notifying the vehicle driver of, for example, a failure of a component involved in running of the vehicle 10, a reduction of function of the component and various information related to running of the vehicle 10. The multi-information display 82 includes a vehicle meter display device such as monitor, display and alarm lamp and/or a sound output device such as speaker and buzzer. The vehicle meter display device is a device configured to warn and notify the vehicle driver in a visual manner. The sound output device is a device configured to warn and notify the vehicle driver in an acoustic manner.

Referring back to FIG. 1, the vehicle 10 further includes a transceiver 84 and a data transmitting ECU 86.

The transceiver 84 is a device configured to communicate with a vehicle data center 100 as an external device which is present apart from the vehicle 10 and is provided outside the vehicle 10. The vehicle data center 100 is a system present on a network outside the vehicle 10, and is configured to receive, process, analyze, store and supply various information such as vehicle state information and vehicle phenomenon information. The vehicle data center 100 transmits and receives the various information to and from at least one other vehicle 200 as well as to and from the vehicle 10. The at least one other vehicle 200, which is other than the vehicle 10, may consist of a plurality of other vehicles 200a, 200b, and each of the at least one other vehicle 200 has substantially the same functions as the vehicle 10. The transceiver 84 may have a function of directly communicating with the at least one other vehicle 200 present in the vicinity of the vehicle 10 without via the vehicle data center 100. The vehicle state information represents, for example, an operation or driving state relating to driving of the vehicle 10, which is detected by the various sensors or the like. This operation or driving state is represented, for example, by the accelerator operation degree θacc and the vehicle running speed V. The vehicle phenomenon information represents, for example, phenomenons caused in the vehicle 10. These phenomenons are, for example, an acoustic pressure, i.e., a sound or noise inside the vehicle 10, which is detected by a microphone (not shown) and a vibration felt by the vehicle driver and passengers in the vehicle 10, which is detected by a G sensor (not shown). In the following description of the present embodiment, the above-described noise and vibration will be referred to as "NV". It can be considered that the electronic control device 90 of the vehicle 10 cooperates with an electronic control device (which functionally corresponds to the electronic control device 90) of each of the at least one other vehicle 200, or with the vehicle data center 100 and the electronic control device of each of the at least one other vehicle 200, to constitute a vehicle control system.

The data transmitting ECU 86 has substantially the same hardware construction as the electronic control apparatus 90. The data transmitting ECU 86 is connected to the transceiver 84, and is configured to transmit and receive various information to and from the vehicle data center 100, by using a wireless communication between the transceiver 84 and the vehicle data center 100.

For performing various control operations in the vehicle 10, the electronic control apparatus 90 includes a hybrid control means or portion in the form of a hybrid control portion 92.

The hybrid control portion 92 has a function serving as an engine control means or portion 92a for controlling the operation of the engine 12 and a function serving as a rotating-machine control means or portion 92b for controlling the operations of the first rotating machine MG1 and the second rotating machine MG2 via the inverter 52, and executes a hybrid drive control, for example, using the engine 12, the first rotating machine MG1 and the second rotating machine MG2 through these control functions.

The hybrid control portion 92 calculates a drive request amount, by applying the accelerator opening degree θacc and the vehicle running speed V to, for example, a drive force map that is a predetermined relationship, i.e., a pre-stored relationship obtained by experimentation or determined by an appropriate design theory. The above-described drive request amount is, for example, the drive torque Tr required in the vehicle 10, i.e., a required drive torque Trdem required to be applied to the drive wheels 16. From another viewpoint, this required drive torque Trdem corresponds to a required drive power Prdem at the current running speed V. It is noted that, in place of the running speed V, the output rotational speed No may be used, for example.

The hybrid control portion 92 outputs the engine control command signal Se for controlling the engine 12 and the rotating-machine control command signals Smg for controlling the first and second rotating machines MG1, MG2, by taking account of the maximum charging amount Win of electric power that can be charged to the battery 54, and the maximum discharging amount Wout of electric power that can be discharged from the battery 54, such that the required drive power Prdem is obtained. The engine control command signal Se is, for example, a command value of an engine power Pe that is the power of the engine 12 outputting the engine torque Te at the current engine rotational speed Ne. The rotating-machine control command signal Smg is, for example, a command value of the generated electric power Wg of the first rotating machine MG1 outputting the MG1 torque Tg as the reaction torque of the engine torque Te at the MG1 rotational speed Ng which is the MG1 rotational speed Ng at the time of command signal Smg output, and is a command value of a consumed electric power Wm of the second rotating machine MG2 outputting the MG2 torque Tm at the MG2 rotational speed Nm which is the MG2 rotational speed Nm at the time of command signal Smg output.

For example, when the transmission portion 22 is operated as the continuously variable transmission as a whole, the hybrid control portion 92 controls the engine 12 and controls the generated electric power Wg of the first rotating machine MG1 so as to attain the engine rotational speed Ne and the engine torque Te at which the required engine power Pedem achieving the required drive power Prdem is acquired, in consideration of, for example, an engine optimum fuel consumption point. As a result of this control, the gear ratio γ of the transmission portion 22 is controlled in the case of operating the transmission portion 22 as the continuously variable transmission. The above-described engine optimum fuel consumption point is predetermined as an optimum engine operation point, i.e., the engine operation point that maximizes a total fuel efficiency in the vehicle 10 including not only a fuel efficiency of the engine 12 but also a charge/discharge efficiency of the battery 54 and a transmission efficiency of the drive-force transmitting device 14, for example, when the required engine power Pedem is to be acquired.

The hybrid control portion 92 selectively establishes the EV running mode or the HV running mode as the running mode depending on a driving state, so as to cause the vehicle 10 to run in a selected one of the running modes. For example, the hybrid control portion 92 establishes the EV running mode when the required drive power Prdem is in an EV running region smaller than a predetermined threshold value, and establishes the HV running mode when the required drive power Prdem is in an HV running region not smaller than the predetermined threshold value. However, even when the required drive power Prdem is in the EV running region, the hybrid control portion 92 establishes the HV running mode, if the charged state value SOC of the battery 54 is less than a predetermined engine-start threshold value, or if the engine 12 needs to be warmed up. The engine-start threshold value is a predetermined threshold value for determining that the charged state value SOC reaches a level at which the engine 12 needs to be forcibly started for charging the battery 54.

The hybrid control portion 92 (particularly, the engine control portion 92a) executes the certain control operation in the form of an engine-start control operation for staring the engine 12. The hybrid control portion 92 executes the engine-start control operation, for example, when establishing the HV running mode during stop of the engine 12. For staring the engine 12, the hybrid control portion 92 increases the engine rotational speed Ne by the first rotating machine MG1, and starts the engine 12, by igniting when the engine rotational speed Ne becomes at least a certain speed value that is an ignitable speed value. That is, the hybrid control portion 92 starts the engine 12 by cranking the engine 12 by the first rotating machine MG1.

Figure 3:
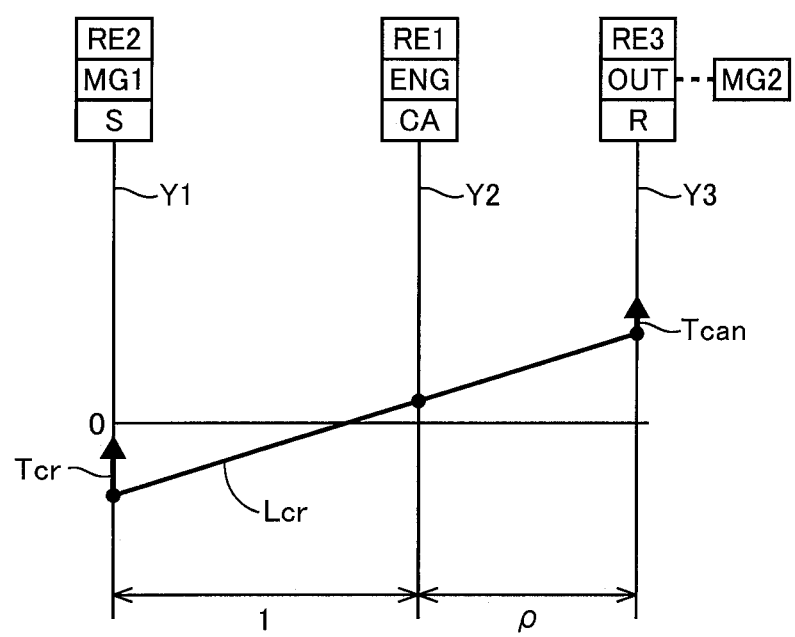
FIG. 3 is a collinear chart indicating a relationship among rotational speeds of the rotary elements of the transmission portion in execution of an engine-start control operation for starting an engine of the vehicle.

FIG. 3 is a collinear chart indicating a relationship among rotational speeds of the rotary elements of the transmission portion 22 in execution of the engine-start control operation for starting the engine 12. The vertical lines Y1, Y2, Y3 in FIG. 3 are the same as those in FIG. 2. In FIG. 3, a solid line Lcr indicates the relative speeds of the rotary elements of the transmission portion 22 in process of cranking the engine 12 by the MG1 torque Tg. During the forward running with the EV running mode (see broken line Lm in FIG. 2), when the MG1 torque Tg serving as a cranking torque Tcr as the positive torque is inputted to the sun gear S, the rotational speed of the carrier CA, i.e., the engine rotational speed Ne can be increased. The engine 12 is started by ignition when the engine rotational speed Ne becomes a certain speed value or higher. When the engine 12 is started, the ring gear R receives a reaction torque acting as a negative torque against the cranking torque Tcr whereby the drive torque Tr could be reduced by the reaction torque. Therefore, in the engine-start control operation, the MG2 torque Tm is increased to apply, to the ring gear R, a compensation torque Tcan for compensating an amount corresponding to the reaction torque.

By the way, a property of a fuel FUEL could vary depending on a refueling point 300 (see FIG. 1) that offers the fuel FUEL. The variation or difference in the property of the fuel FUEL could change a characteristic of the engine torque Te, thereby causing a risk of reduction of drivability when a certain control operation is executed. An example of the difference in the property of the fuel FUEL is a difference between a heavy oil and a light oil. The certain control operation is, for example, the engine-start control operation for staring the engine 12.

Figure 4:
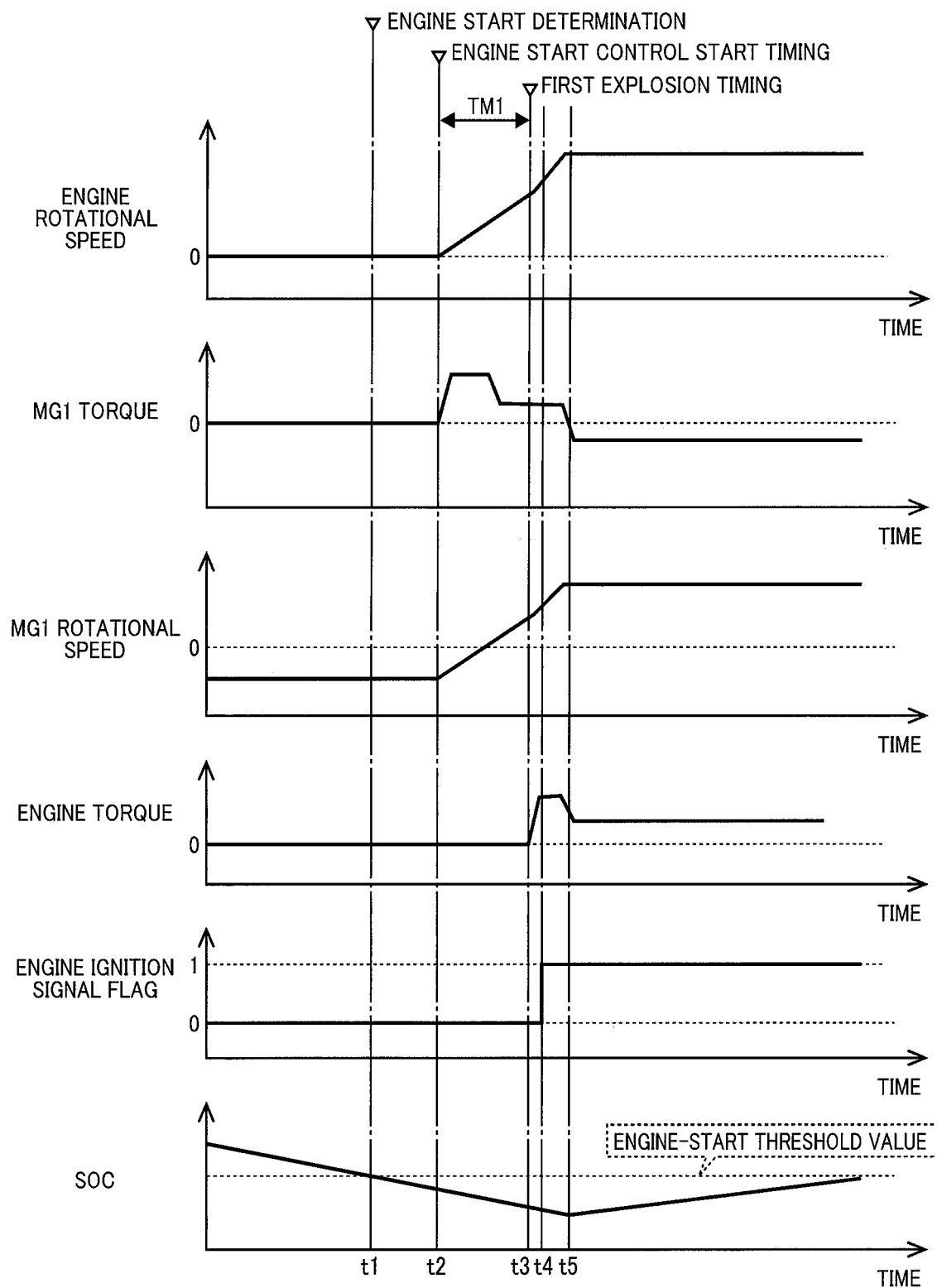
FIG. 4 is a time chart for explaining an example of an engine torque characteristic having appeared in execution of the engine-start control operation.

FIG. 4 is a time chart for explaining an example of the characteristic of the engine torque Te having appeared in execution of the engine-start control operation for starting the engine 12. As shown in FIG. 4, a time point t1 is a point of time at which the charged state value SOC [%] of the battery 54 becomes smaller than the engine-start threshold value, so that it is determined that the engine 12 needs to be started. A time point t2 is an engine-start-control start timing, and is a point of time at which the engine-start control operation is started. From the engine engine-start-control start timing, the MG1 torque Tg acting as the cranking torque Tcr is applied. When the engine rotational speed Ne becomes the certain speed value or higher, an ignition is made in response to an ignition signal (see time point t4). In the process of the engine-start control operation shown in FIG. 4, due to the property of the fuel FUEL, a pre-ignition is caused, namely, the engine torque Te starts to be generated at a point of time earlier than the ignition signal (see time point t3). The pre-ignition is a phenomenon in which an air-fuel mixture is spontaneously ignited inside a cylinder at a point of time earlier than a timing of a normal ignition by an ignition plug. A first explosion timing, i.e., a point of time at which the engine torque Te starts to be generated, can be detected by the engine rotational speed Ne. When the engine-start control operation has been completed, the MG1 torque Tg acting as the reaction torque against the engine torque Te is applied (see time point t5 and thereafter). The above-described first explosion timing is an example of the characteristic of the engine torque Te. In the present embodiment, as a value representing the first explosion timing, a first explosion time TM1, i.e., a length of time from the engine engine-start-control start timing (time point t2) to the first explosion timing (time point t3), is used.

If the first explosion timing, i.e., the first explosion time TM1 is deviated from an expected value, it could be impossible to appropriately perform control operations such as a control operation for offsetting a first explosion torque that is the engine torque Te generated in the first explosion, thereby causing a risk of failure in suppression of shock caused by the first explosion and reduction of the drivability such as undesirable increase of the above-described NV. The NV is a rattle noise generated due to backlashes between meshing gears, for example, in the differential mechanism 38, which is caused by, for example, resonance of the damper 13. The above-described first explosion torque is an example of the characteristic of the engine torque Te.

The characteristic of the engine torque Te such as the first explosion time TM1 and the first explosion torque could be changed also by various factors such as an outside temperature, an engine coolant temperature, an atmospheric pressure or other environment and a fuel injection amount or other control state. Thus, the difference of the characteristic of the engine torque Te is caused not necessarily due to the property of the fuel FUEL. It is therefore necessary to take time to make a determination as to whether the difference of the characteristic of the engine torque Te, i.e., the reduction of the drivability is caused by the property of the fuel FUEL or not, and efforts by personnel are required to develop a program or the like for making such a determination. Further, there is a risk of reduction of controllability of the vehicle 10 in execution of the certain control operation, unless the reduction of the drivability due to difference in the property of the fuel FUEL can be quickly detected.

Referring back to FIG. 1, the electronic control apparatus 90 further includes a state determining means or portion in the form of a state determining portion 94, a characteristic storage means or portion in the form of a characteristic storage portion 96, a factor determination means or portion in the form of a factor determination portion 98, and a notification means or portion in the form of a notification portion 99, for performing a control function of quickly detecting the reduction of the drivability due to difference in the property of the fuel FUEL.

The state determining portion 94 determines whether the vehicle 10 has been refueled with the fuel FUEL, namely, whether a refueling event has occurred. The state determining portion 94 makes this determination as to whether the refueling event has occurred or not, depending on, for example, whether the remaining fuel amount Qfuel is increased by at least a certain amount or not, or whether a ratio of increase of the remaining fuel amount Qfuel is higher than at least a certain ratio or not. Each of the certain amount and the certain ratio is, for example, a predetermined threshold value by which it can be determined that the increase of the remaining fuel amount Qfuel has been caused by refueling of the vehicle 10 with the fuel FUEL.

When it is determined by the state determining portion 94 that the refueling event has occurred, the characteristic storage portion 96 obtains information related to the refueling point 300. The refueling point 300 is, for example, a refueling station such as a refueling station A and a refueling station B. Further, the refueling point 300 may be a storage tank of each refueling station such as a storage tank Aa and a storage tank Ab of the refueling station A and a storage tank Ba and a storage tank Bb of the refueling station B. The information related to the refueling point 300 includes, for example, information of each refueling station such as its name and location, information of each storage tank which is linked to a refueling equipment such as a fuel supply hose, information of a refuel time and date, and information of an oil supplier who supplied the fuel FUEL stored in each storage tank. The characteristic storage portion 96 obtains the information related to the refueling point 300, based on the information of the storage tank and the oil supplier which is obtained through, for example, the location information Ivp, the navigation information Inavi and the vehicle data center 100.

The characteristic storage portion 96 specifies, based on the information related to the refueling point 300, a supply source from which the fuel FUEL stored in the fuel tank 80 has been supplied. The supply source of the fuel FUEL is, for example, the refueling station such as the refueling station A and the refueling station B, the storage tanks of each refueling station and the oil suppliers having supplied the fuel FUEL stored in each storage tank.

The characteristic storage portion 96 memorizes or stores therein torque-characteristic information representing an output torque characteristic as the characteristic of the engine torque Te, which has appeared in execution of the above-described certain control operation in the vehicle 10, such that the stored torque-characteristic information is divided into a plurality of groups corresponding to the respective supply sources of the fuel FUEL. Since there is a limitation of a memory or storage capacity in the electronic control apparatus 90, the characteristic storage portion 96 keeps the torque-characteristic information related to the refueling station or stations in which the vehicle 10 has been refueled with the fuel FUEL in the latest opportunity or opportunities, such that a data amount of the kept torque-characteristic information corresponds to the limited storage capacity. In other words, old torque-characteristic information stored in a memory is overwritten by new torque-characteristic information. The characteristic storage portion 96 serves as a history storage portion configured to save or store a history of the characteristic of the engine torque Te having appeared in execution of the certain control operation such that stored information, i.e., the stored history, is divided into a plurality of groups corresponding to the respective supply sources of the fuel FUEL.

In the fuel tank 80 after the refueling event has occurred, the fuel FUEL that had remained in the fuel tank 80 before the refueling event and the fuel FUEL that has been newly introduced into the fuel tank 80 in the refueling event are mixed with each other, namely, the fuel tank 80 stores therein (i) a remaining fuel FUEL as the fuel FUEL that had remained in the fuel tank 80 before the vehicle 10 has been refueled at one of the refueling points 300 and (ii) a newly introduced fuel FUEL as the fuel FUEL that has been newly introduced into the fuel tank 80 when the vehicle 10 has been refueled at the one of the refueling points 300. In this instance, the characteristic storage portion 96 stores therein the torque-characteristic information representing the characteristic of the engine torque Te, which has appeared in execution of the certain control operation in the vehicle 10 after the vehicle 10 has been refueled at the one of the refueling points 300, such that the stored torque-characteristic information is divided into two groups as the plurality of groups, based on a ratio between an amount of the remaining fuel FUEL and an amount of the newly introduced fuel FUEL. One of the two groups corresponds to the above-described one of the refueling points 300 (at which the vehicle 10 has been refueled), while the other of the two groups corresponds to another one of the refueling points 300 that is the supply source of the remaining fuel FUEL.

Figure 5:
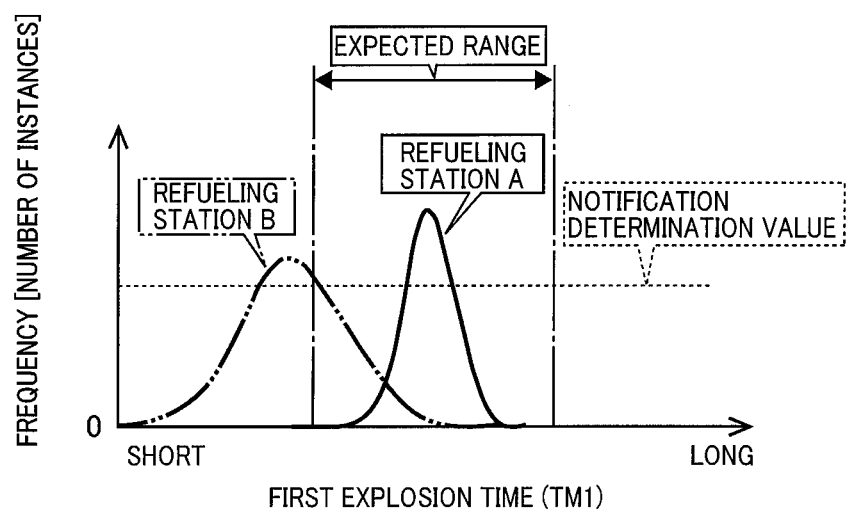
FIG. 5 is a view showing an example of a frequency distribution of a first explosion time in execution of the engine-start control operation, in a case in which the vehicle has been refueled with a fuel in a refueling station A and in another case in which the vehicle has been refueled with the fuel in a refueling station B.
Figure 6:
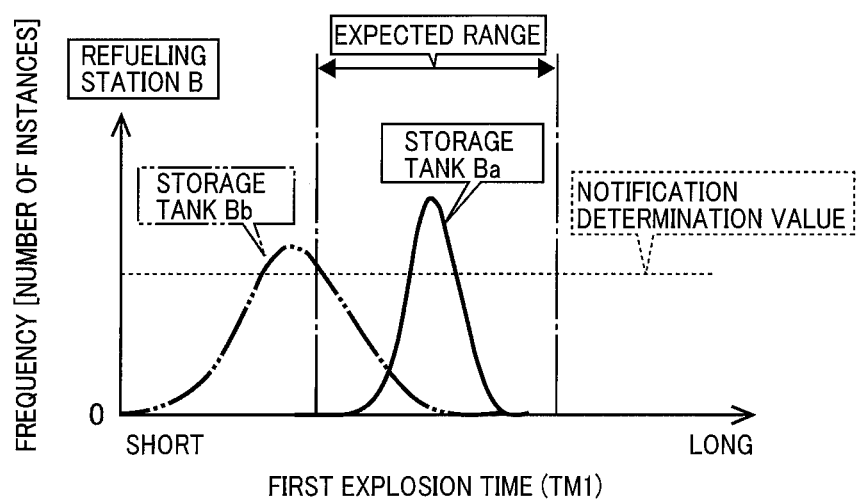
FIG. 6 is a view showing an example of the frequency distribution of the first explosion time in execution of the engine-start control operation, in a case in which the vehicle has been refueled with the fuel stored in a storage tank Ba of the refueling station B and another case in which the vehicle has been refueled with the fuel stored in a storage tank Bb of the refueling station B.
Figure 7:
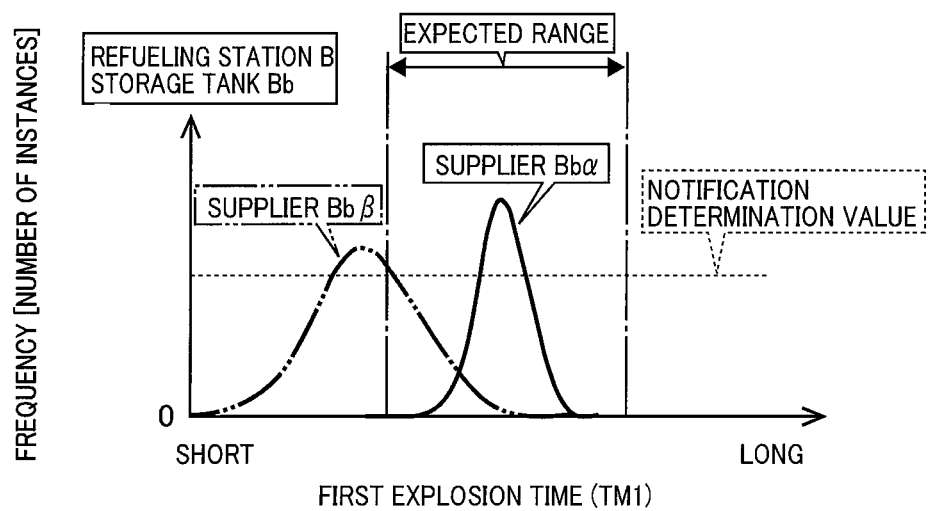
FIG. 7 is a view showing an example of the frequency distribution of the first explosion time in execution of the engine-start control operation, in a case in which the vehicle has been refueled with the fuel stored in the storage tank Bb and supplied from a supplier Bbα and another case in which the vehicle has been refueled with the fuel stored in the storage tank Bb and supplied from a supplier Bbβ.

Each of FIGS. 5-7 is a view showing an example of a frequency distribution of the first explosion time TM1 in execution of the engine-start control operation for starting the engine 12. In each of FIGS. 5-7, the frequency distribution represents a frequency (i.e., number of instance) in which the first explosion time TM1 as a variable appeared in each of various levels in execution of the engine start control operation. The first explosion time TM1, which is the characteristic of the engine torque Te, is represented by the torque-characteristic information that is stored in the characteristic storage portion 96 such that the stored torque-characteristic information is divided into the plurality of groups corresponding to the respective supply sources of the fuel FUEL.

FIG. 5 shows the frequency distribution of the first explosion time TM1 in cases in which the vehicle 10 has been refueled with the fuel FUEL in respective two different refueling stations A, B. In FIG. 5, solid line represents the frequency distribution of the first explosion time TM1 in the case in which the vehicle 10 has been refueled with the fuel FUEL in the refueling station A, and two-dot chain line represents the frequency distribution of the first explosion time TM1 in the case in which the vehicle 10 has been refueled with the fuel FUEL in the refueling station B. FIG. 6 shows the frequency distribution of the first explosion time TM1 in cases in the vehicle 10 has been refueled with the fuel FUEL stored in respective two different storage tanks Ba, Bb of the refueling station B. In FIG. 6, solid line represents the frequency distribution of the first explosion time TM1 in the case in which the vehicle 10 has been refueled with the fuel FUEL stored in the storage tank Ba, and two-dot chain line represents the frequency distribution of the first explosion time TM1 in the case in which the vehicle 10 has been refueled with the fuel FUEL stored in the storage tank Bb. FIG. 7 shows the frequency distribution of the first explosion time TM1 in cases in the vehicle 10 has been refueled with the fuel FUEL supplied from respective two different suppliers Bbα, Bbβ through the storage tank Bb of the refueling station B. In FIG. 7, solid line represents the frequency distribution of the first explosion time TM1 in the case in which the vehicle 10 has been refueled with the fuel FUEL stored in the storage tank Bb and supplied from the supplier Bbα, and two-dot chain line represents the frequency distribution of the first explosion time TM1 in the case in which the vehicle 10 has been refueled with the fuel FUEL stored in the storage tank Bb and supplied from the supplier Bbβ.

In each of FIGS. 5-7, when the frequency distribution represented by the solid line and the frequency distribution represented by the two-dot chain line are deviated from each other, there is a high possibility that the deviation is due to the difference in the property of the fuel FUEL. Specifically, the factor determination portion 98 makes a determination as to whether the frequency distribution represented by the solid line and the frequency distribution represented by the two-dot chain line are deviated from each other or not. For example, the factor determination portion 98 makes this determination, by determining whether an average of the first explosion time TM1 in the frequency distribution represented by the solid line and an average of the first explosion time TM1 in the frequency distribution represented by the two-dot chain line are different from each other by at least a threshold value FXa. Alternatively, the factor determination portion 98 may make this determination, by determining whether a dispersion of the first explosion time TM1 in the frequency distribution represented by the solid line and a dispersion of the first explosion time TM1 in the frequency distribution represented by the two-dot chain line are different from each other by at least a threshold value FXb, in addition to determining whether the two averages are different from each other by at least the threshold value FXa. Thus, the factor determination portion 98 determines that the difference in the first explosion time TM1 is caused by the difference in the property of the fuel FUEL, when the two averages are different from each other by at least the threshold value FXa, or when the two averages are different from each other by at least the threshold value FXa and the two dispersions are different from each other by at least the threshold value FXb. Each of the threshold values FXa, FXb is a predetermined threshold value by which it can be determined, for example, that the difference is present in the property of the fuel FUEL. In short, whether the difference is present or absent in the property of the fuel FUEL can be determined depending on the difference between the frequency distributions in cases of respective different supply sources, by a quantitative comparison through a known statistical method. Thus, the factor determination portion 98 determines whether the difference in the characteristic of the engine torque Te due to supply of the fuel FUEL from different supply sources is at least the predetermined threshold value or not. The factor determination portion 98 determines that the difference in the characteristic of the engine torque Te is caused by the difference in the property of the fuel FUEL, when the difference in the characteristic of the engine torque Te due to supply of the fuel FUEL from different supply sources is at least the predetermined threshold value, namely, when the characteristic of the engine torque Te represented by the torque-characteristic information belonging to one of the above-described plurality of groups and the characteristic of the engine torque Te represented by the torque-characteristic information belonging to another one of the above-described plurality of groups are different from each other and a characteristic difference therebetween is not smaller than the predetermined threshold value.

The above-described certain control operation needs to be executed at least a certain number of times, for defining the frequency distribution shown in each of FIGS. 5-7. The frequency distribution can be defined easier by using not only the torque-characteristic information of the vehicle 10 but also other-vehicle-torque-characteristic information of at least one other vehicle 200 which is other than the vehicle 10 and which basically has the same functions as the vehicle 10 as described above. The other-vehicle-torque-characteristic information is information representing the characteristic of the engine torque Te, which has appeared when the same certain control operation has been executed in each of the at least one other vehicle 200. As the vehicle-torque-characteristic information in the vehicle 10, the other-vehicle-torque-characteristic information is stored in a characteristic storage portion functionally equivalent to the characteristic storage portion 96 in the vehicle 10 such that the stored other-vehicle-torque-characteristic information is divided into a plurality of groups corresponding to the respective supply sources of the fuel FUEL. The vehicle data center 100 collects the vehicle-torque-characteristic information from the vehicle 10 and the other-vehicle-torque-characteristic information from the at least one other vehicle 200, and stores therein the collected information that is a part of a big data stored in the vehicle data center 100. The factor determination portion 98 obtains, from the vehicle data center 100, the part of the big data, i.e., the other-vehicle-torque-characteristic information representing the characteristic of the engine torque Te in the at least one other vehicle 200. The factor determination portion 98 determines whether the difference in the characteristic of the engine torque Te due to supply of the fuel FUEL from different supply sources is at least the predetermined threshold value or not, by using also the characteristic of the engine torque Te, which has appeared when the same certain control operation has been executed in each of the at least one other vehicle 200.

As shown in FIG. 5, the frequency distribution of the first explosion time TM1 in the case of the refuel with the fuel FUEL in the refueling station A is held within an expected range expected in a design process, while the frequency distribution of the first explosion time TM1 in the case of the refuel with the fuel FUEL in the refueling station B is partially outside the expected range. That is, in the case of the refuel with the fuel FUEL in the refueling station B, there are some values of the first explosion time TM1, which are outside the expected range, so that there is a possibility that the above-described NV could be undesirably increased. When the frequency in the frequency distribution of the first explosion time TM1 in the case of the refuel with the fuel FUEL in the refueling station B exceeds a threshold value (i.e., notification determination value), the notification portion 99 causes the multi-information display 82 to indicate a suggestion or advice to change the refueling station for the refuel of the fuel FUEL from the refueling station B to the refueling station A. The above-described threshold value of the frequency is, for example, a predetermined threshold value for determining a need to advise the vehicle driver to change the refueling point 300. Thus, in a case in which the controllability in execution of the certain control operation is reduced by the difference in the property of the fuel FUEL when it is determined by the factor determination portion 98 that the difference in the first explosion time TM1 is caused by the difference in the property of the fuel FUEL, the notification portion 99 advises the vehicle driver to change the refueling point 300. However, the advice to change the refueling point 300 does not necessarily have to be given to the vehicle driver. For example, the notification portion 99 may notify the vehicle driver simply that the property of the fuel FUEL provided by the refueling station A and the property of the fuel FUEL provided by the refueling station B are different from each other. Alternatively, the notification portion 99 may notify the vehicle driver simply that the refueling station A is more suitable for the vehicle 10 than the refueling station B. That is, when it is determined by the factor determination portion 98 that the difference in the characteristic of the engine torque Te is caused by the difference in the property of the fuel FUEL, the notification portion 99 may notify the vehicle driver of the information related to the refueling points 300.

As shown in FIG. 6, the frequency distribution of the first explosion time TM1 in the case of the refuel with the fuel FUEL stored in the storage tank Ba of the refueling station B is held within the expected range expected in the design process, while the frequency distribution of the first explosion time TM1 in the case of the refuel with the fuel FUEL stored in the storage tank Bb of the same refueling station B is partially outside the expected range. Since there is a significant difference in the storage tank Bb, the electronic control apparatus 90 advises the refueling station B to inspect the storage tank Bb. Such an advisory information is transmitted to the refueling station B via the vehicle data center 100, for example.

As shown in FIG. 7, the frequency distribution of the first explosion time TM1 in the case of the refuel with the fuel FUEL stored in the storage tank Bb and supplied from the supplier Bbα is held within the expected range expected in the design process, while the frequency distribution of the first explosion time TM1 in the case of the refuel with the fuel FUEL stored in the same storage tank Bb but supplied from the supplier Bbβ is partially outside the expected range. Since there is a significant difference in the fuel FUEL supplied from the supplier Bbβ, the electronic control apparatus 90 advises the refueling station B to inspect the fuel FUEL supplied from the supplier Bbβ. Such an advisory information is transmitted to the refueling station B via the vehicle data center 100, for example.

There is a possibility that the NV could be undesirably increased with use of the fuel FUEL that causes the first explosion time TM1 as the characteristic of the engine torque Te to result in the frequency distribution as represented by the two-dot chain line in FIGS. 5-7 in execution of the certain control operation in the vehicle 10. Therefore, in a case with use of the fuel FUEL that causes the first explosion time TM1 to result in the frequency distribution as represented by the two-dot chain line, the hybrid control portion 92 restricts or inhibits an idling stop control of the engine 12, or restricts or inhibits switching from the HV running mode to the EV running mode. That is, in a case in which the controllability in execution of the engine-start control operation of the engine 12 is reduced by the difference in the property of the fuel FUEL when it is determined by the factor determination portion 98 that the difference in the first explosion time TM1 is caused by the difference in the property of the fuel FUEL, the hybrid control portion 92 (particularly, the engine control portion 92a) restricts or inhibits an intermittent operation of the engine 12. However, the NV could be somewhat generated also in a case using the fuel FUEL that causes the first explosion time TM1 as the characteristic of the engine torque Te to result in the frequency distribution as represented by the solid line in FIGS. 5-7 in execution of the engine-start control operation of the engine 12. Therefore, it may be possible to restrict or inhibit the engine-start control operation of the engine 12 as long as the property of the fuel FUEL varies. That is, the hybrid control portion 92 (particularly, the engine control portion 92a) may restrict or inhibit the intermittent operation of the engine 12 as long as it is determined by the factor determination portion 98 that the difference in the characteristic of the engine torque Te is caused by the difference in the property of the fuel FUEL. The restriction of the idling stop control can be made, for example, by making a condition more severe, which is to be satisfied to execute the idling stop control. The restriction of the switching from the HV running mode to the EV running mode can be made, for example, by reducing the above-described predetermined threshold value of the required drive power Prdem which defines the EV running region. The intermittent operation of the engine 12 is an operation in which the engine 12 is alternately started and stopped.

Figure 8:
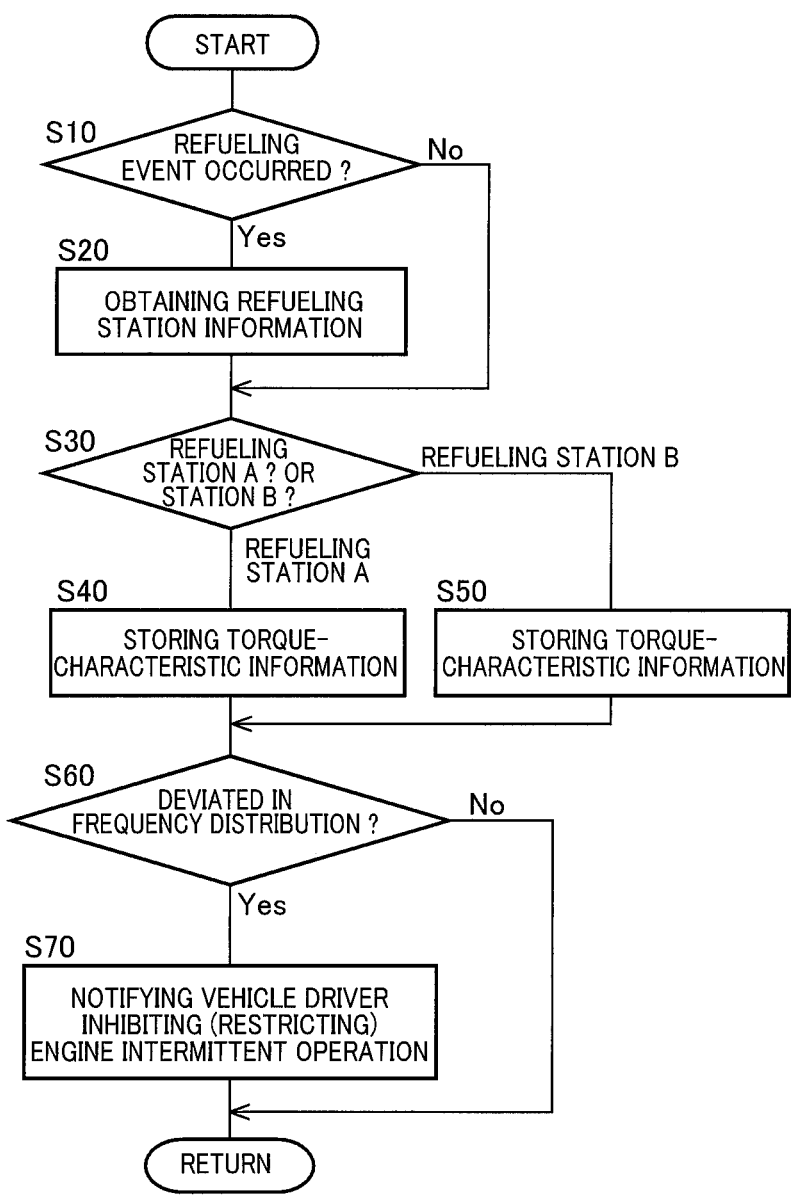
FIG. 8 is a flow chart showing a main part of a control routine executed by the electronic control apparatus, namely, a control routine that is executed for quickly detecting reduction of a drivability due to difference in a property of the fuel.

FIG. 8 is a flow chart showing a main part of a control routine executed by the electronic control apparatus 90, namely, a control routine that is executed for quickly detecting reduction of a drivability due to the difference in the property of the fuel FUEL. This control routine is executed, for example, in a repeated manner. FIG. 8 shows, by way of example, a case in which the refueling stations are the refueling station A and the refueling station B.

As shown in FIG. 8, the control routine is initiated with step S10 corresponding to function of the state determining portion 94, which is implemented to determine whether the refueling event has occurred. When an affirmative determination is made at step S10, step S20 corresponding to function of the characteristic storage portion 96 is implemented to obtain the information related to the refueling point 300. When a negative determination is made at step S10 or after step S20 has been implemented, step S30 corresponding to function of the characteristic storage portion 96 is implemented to identify or specify the supply source of the fuel FUEL stored in the fuel tank 80. At this step S30, it is determined that the refueling station in which the vehicle 10 has been refueled, is the refueling station A or the refueling station B. When it is determined at step S30 that the refueling station is the refueling station A, step S40 corresponding to function of the characteristic storage portion 96 is implemented to store the torque-characteristic information representing the characteristic of the engine torque Te (e.g., the frequency distribution of the first explosion time TM1), which has appeared in execution of the certain control operation in the vehicle 10, such that the torque-characteristic information is stored as information belonging to one of the plurality of groups that corresponds to the refueling station A. When it is determined at step S30 that the refueling station is the refueling station B, step S50 corresponding to function of the characteristic storage portion 96 is implemented to store the torque-characteristic information representing the characteristic of the engine torque Te (e.g., the frequency distribution of the first explosion time TM1), which has appeared in execution of the certain control operation in the vehicle 10, such that the torque-characteristic information is stored as information belonging to one of the plurality of groups that corresponds to the refueling station B. After step S40 or step S50 has been implemented, step S60 corresponding to function of the factor determination portion 98 is implemented to compare between the torque-characteristic information stored in step S40 and the torque-characteristic information stored in step S50, namely, compare between the characteristic of the engine torque Te belonging to the group corresponding to the refueling station A and the characteristic of the engine torque Te belonging to the group corresponding to the refueling station B, so as to determine whether the frequency distributions of the first explosion time TM1 stored in respective steps S40, S50 are deviated from each other or not. When a negative determination is made at step S60, one cycle of execution of the control routine is terminated. When an affirmative determination is made at step S60, step S70 corresponding to functions of the notification portion 99 and the hybrid control portion 92 is implemented to notify the vehicle driver of the suggestion to change the refueling station, as needed, and to restrict or inhibit the intermittent operation of the engine 12, as needed.

As described above, in the above-described embodiment, when the characteristic of the engine torque Te represented by the torque-characteristic information belonging to one of the plurality of groups corresponding to one of the refueling points 300 and the characteristic of the engine torque Te represented by the torque-characteristic information belonging to another one of the plurality of groups corresponding to another one of the refueling points 300 are different from each other and the characteristic difference therebetween is not smaller than the threshold value, it is determined that the characteristic difference is caused by a difference in the property of the fuel FUEL. It is therefore possible to quickly detect the reduction of the drivability due to the difference in the property of the fuel FUEL. For example, when the first explosion time TM1 in execution of the engine-start control operation, which is represented by the torque-characteristic information belonging to one of the plurality of groups corresponding to one of the refueling points 300 and the first explosion time TM1 in execution of the engine-start control operation, which is represented by the torque-characteristic information belonging to another one of the plurality of groups corresponding to another one of the refueling points 300 are different from each other by at least a threshold value, it is determined that the difference in the first explosion time TM1 is caused by the difference in the property of the fuel FUEL, so that it is possible to quickly detect the reduction of the drivability, for example, the desirable increase of the NV, due to the difference in the property of the fuel FUEL.

In the present embodiment, when it is determined that the characteristic difference is caused by the difference in the property of the fuel FUEL, the intermittent operation of the engine 12 is restricted or inhibited so that it is possible to reduce the frequency of the increase of the NV in execution of the engine-start control operation.

In the present embodiment, the torque-characteristic information representing the characteristic of the engine torque Te is stored such that the stored torque-characteristic information is divided into the plurality of groups corresponding to the respective refueling points, namely, divided into a group corresponding to the refueling point of the remaining fuel FUEL and a group corresponding to the refueling point of the newly introduced fuel FUEL, based on the ratio between the amount of the remaining fuel FUEL and the amount of the newly introduced fuel FUEL. It is therefore possible to improve an accuracy of the determination that the characteristic difference is caused by the difference in the property of the fuel FUEL.

In the present embodiment, the refueling points 300 are the storage tanks each provided in the refueling station, so that the stored torque-characteristic information is divided into the plurality of groups corresponding to the respective storage tanks, whereby the characteristic of the engine torque Te in case of each one of the storage tanks can be obtained. This arrangement makes it possible to detect a failure of each one of the storage tank in the refueling station and obtain the characteristic of the engine torque Te in case of each one of the oil suppliers. Further, it is possible to notify the refueling station of the variation or change in the property of the fuel FUEL and accordingly to early recognize a failure.

In the present embodiment, it is determined whether the difference in the characteristic of the engine torque Te is at least the threshold value or not, by using not only the torque-characteristic information of the vehicle 10 but also the big data, i.e., the other-vehicle-torque-characteristic information of the at least one other vehicle 200, wherein the other-vehicle-torque-characteristic information representing the characteristic of the engine torque Te that has appeared in execution of the certain control operation in the at least one other vehicle 200, such that the other-vehicle-torque-characteristic information is divided into the plurality of groups corresponding to the respective refueling points. It is therefore possible to improve the accuracy of the determination that the characteristic difference is caused by the difference in the property of the fuel FUEL, and to further quickly detect the reduction of the drivability due to the difference in the property of the fuel FUEL.

In the present embodiment, when it is determined that the characteristic difference is caused by the difference in the property of the fuel FUEL, the information related to the refueling point 300 is notified to the vehicle driver. It is therefore possible to try to improve the drivability earlier than an opportunity in which a factor causing reduction of the drivability is investigated and a countermeasure is taken to resolve the reduction of the drivability, for example, in a maintenance shop of a vehicle dealer. Further, it is possible to notify the refueling station of the variation or change in the property of the fuel FUEL and accordingly to early recognize a failure so as to suppress or prevent increase of vehicles that would suffer from the undesirable increase of the NV.

While the preferred embodiment of this invention has been described in detail by reference to the drawings, it is to be understood that the invention may be otherwise embodied.

For example, in the above-described embodiment, the characteristic storage portion 96, the factor determination portion 98 and the notification portion 99, which are included in the "control apparatus" recited in the appended claims, are all provided in the electronic control apparatus 90, namely, all control functions of the "control apparatus" are provided in the electronic control apparatus 90, so that the electronic control apparatus 90 serves as the "control apparatus". However, this arrangement is not essential. For example, all or a part of the control functions of the "control apparatus" may be provided in the vehicle data center 100.

Further, the notification that the characteristic of the engine torque Te is caused by the difference in the property of the fuel FUEL may be displayed in a monitor of a personal computer or the like that is connected to the vehicle data center 100 via a certain network, or displayed in a monitor of a diagnostic device or the like that is connected to the vehicle 10, for example, in a maintenance shop of a vehicle dealer.

In the above-described embodiment, the engine-start control operation for starting the engine 12 is executed as an example of the certain control operation, and the first explosion time TM1 corresponds to the characteristic of the engine torque Te appearing in execution of the engine-start control operation as the certain control operation. However, the certain control operation does not have to be necessarily the engine-start control operation but may be any control operation related to the engine torque Te such as a control operation accompanied by change of the engine torque Te and a control operation executed to maintain the engine torque Te. Further, the characteristic of the engine torque Te may be a probability of knocking or any other parameter representing difference of the engine torque Te.

In the above-described embodiment, the control routine shown by the flow chart of FIG. 8 is executed in an case in which the refueling stations are the refueling station A and the refueling station B, namely, possible refueling points consist of the two refueling stations. However, step S30 of the control routine may be implemented to specify the refueling station as one of three or more possible refueling stations, specify the storage tank as one of two or more possible storage tanks of a refueling station, or specify the oil supplier as one of two or more possible oil supplies who supplied the fuel FUEL stored in a storage tank. Further, the control routine shown by the flow chart of FIG. 8 may be modified as needed. For example, step S70 does not have to be necessarily implemented in the control routine.

In the above-described embodiment, the vehicle 10 including the transmission portion 22 has been described by way of example of the vehicle to which the present invention is applied. However, the invention is applicable not only to the vehicle 10 but also to any vehicle including an engine. For example, the invention is applicable also to an engine vehicle having only an engine as the drive force source. In such an engine vehicle, which cannot perform the motor running unlike a hybrid vehicle, the intermittent operation of the engine is restricted or inhibited, for example, by restricting or inhibiting the idling stop control of the engine.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine
90: electronic control apparatus (control apparatus)
92a: engine control portion
96: characteristic storage portion
98: factor determination portion
99: notification portion
200 (200a, 200b): at least one other vehicle
300: refueling point
A, B: refueling station
Aa, Ab, Ba, Bb: storage tank
FUEL: fuel

What is claimed is:

1. A control apparatus for a vehicle that includes an engine configured to generate a drive force by combustion of a fuel, the control apparatus comprising:
    a characteristic storage portion configured to store therein torque-characteristic information representing an output torque characteristic as a characteristic of an output torque of the engine, which has appeared in execution of a certain control operation in the vehicle, such that the stored torque-characteristic information is divided into a plurality of groups corresponding to respective refueling points that provide the fuel; and
    a factor determination portion configured, when the output torque characteristic represented by the torque-characteristic information belonging to one of the plurality of groups and the output torque characteristic represented by the torque-characteristic information belonging to another one of the plurality of groups are different from each other and a characteristic difference therebetween is not smaller than a threshold value, to determine that the characteristic difference is caused by a difference in a property of the fuel.

2. The control apparatus according to claim 1, further comprising:
    an engine control portion configured to execute an engine-start control operation for starting the engine,
    wherein the certain control operation is the engine control portion, and
    wherein the output torque characteristic is a length of time from a point of time at which execution of the engine-start control operation has been started, to a point of time at which the output torque of the engine has started to be generated.

3. The control apparatus according to claim 2,
    wherein, when it is determined by the factor determination portion that the characteristic difference is caused by the difference in the property of the fuel, the engine control portion is configured to restrict an intermittent operation of the engine.

4. The control apparatus according to claim 1,
    wherein the characteristic storage portion is configured, when the certain control operation has been executed, with a fuel tank of the vehicle storing therein (i) a remaining fuel as the fuel that had remained in the fuel tank before the vehicle has been refueled at one of the refueling points and (ii) a newly introduced fuel as the fuel that has been newly introduced into the fuel tank when the vehicle has been refueled at the one of the refueling points, to store therein the torque-characteristic information representing the output torque characteristic, such that the stored torque-characteristic information is divided into two groups as the plurality of groups, based on a ratio between an amount of the remaining fuel and an amount of the newly introduced fuel.

5. The control apparatus according to claim 1,
    wherein the refueling points are respective storage tanks each provided in a refueling station, so that the stored torque-characteristic information is divided into the plurality of groups corresponding to the respective storage tanks.

6. The control apparatus according to claim 1,
    wherein the factor determining portion is configured to determine whether the characteristic difference is smaller than the threshold value or not, by using not only the torque-characteristic information of the vehicle but also other-vehicle-torque-characteristic information of at least one other vehicle other than the vehicle, the other-vehicle-torque-characteristic information representing the output torque characteristic that has appeared in execution of the certain control operation in the at least one other vehicle, such that the other-vehicle-torque-characteristic information is stored and is divided into a plurality of groups corresponding to the respective refueling points.

7. The control apparatus according to claim 1, further comprising a notification portion configured, when it is determined by the factor determination portion that the characteristic difference is caused by the difference in the property of the fuel, to notify a driver of the vehicle of information related to the refueling points.

* * * * *